(12) United States Patent
Clark et al.

(10) Patent No.: US 7,104,580 B2
(45) Date of Patent: Sep. 12, 2006

(54) FLOOR CONSOLE

(75) Inventors: Kenneth Clark, Howell, MI (US); Richard S. Duff, Auburn Hills, MI (US); Craig Flowerday, Holland, MI (US)

(73) Assignee: Johnson Controls Technology Company, Holland, MI (US)

( * ) Notice: Subject to any disclaimer, the term of this patent is extended or adjusted under 35 U.S.C. 154(b) by 58 days.

(21) Appl. No.: 10/520,392

(22) PCT Filed: Sep. 12, 2003

(86) PCT No.: PCT/US03/28922

§ 371 (c)(1),
(2), (4) Date: Jan. 4, 2005

(87) PCT Pub. No.: WO2004/024508

PCT Pub. Date: Mar. 25, 2004

(65) Prior Publication Data

US 2005/0248169 A1    Nov. 10, 2005

Related U.S. Application Data

(60) Provisional application No. 60/410,226, filed on Sep. 12, 2002.

(51) Int. Cl.
*B60N 3/00* (2006.01)
(52) U.S. Cl. .................... 296/24.32; 296/37.8
(58) Field of Classification Search ............. 296/24.34, 296/37.8; 224/926, 275
See application file for complete search history.

(56) References Cited

U.S. PATENT DOCUMENTS 1,179,445 A    4/1916 Manning
1,412,192 A    4/1922 Moore
4,805,859 A    2/1989 Hudson (Continued)

FOREIGN PATENT DOCUMENTS

DE         3831317         3/1990

(Continued)

OTHER PUBLICATIONS

International Search Report; International Application No. PCT/US/03/28922; mailed May 5, 2004; 3 pgs.

*Primary Examiner*—Kiran B. Patel
(74) *Attorney, Agent, or Firm*—Foley & Lardner LLP

(57) ABSTRACT

A low profile floor console for a vehicle includes a pair of end walls. In a lowered position, the console permits pass through between two spaced apart vehicle seats. When raised, fabric or netting attached, together with the end walls define a storage area. In the preferred embodiment, an add-on module fits over the raised end walls to provide a rigid storage area, and additional functionality, such as a tray, a power port, cup holders, change bins, and the like. The lid of the module may be configured for sliding or pivotal movement to allow access to the interior thereof. Also in the preferred embodiment, the floor console is constructed to trim out a parking brake assembly. In various alternate embodiments, the floor console end walls may be constructed to provide additional functionality, such as internal map pockets, and the console system may be arranged for use at different locations within the vehicle, such as in the cargo area. The add-on console modules may additionally provide a variety of functionality besides storage, such as a cooler, a kid's module, a baby module, an infotainment module, a work module, and the like. Two or more of the floor consoles of the present invention may be used between different seating rows within a vehicle or at other locations in the vehicle.

16 Claims, 11 Drawing Sheets

U.S. PATENT DOCUMENTS

| | | | |
|---|---|---|---|
| 4,809,897 A * | 3/1989 | Wright, Jr. | 224/926 |
| 4,941,718 A | 7/1990 | Alexander, III et al. | |
| 5,067,625 A * | 11/1991 | Numata | 220/827 |
| 5,246,151 A * | 9/1993 | Jabara | 224/544 |
| 5,289,957 A | 3/1994 | Huang | |
| 5,338,081 A | 8/1994 | Young et al. | |
| 5,397,160 A | 3/1995 | Landry | |
| 5,492,257 A | 2/1996 | Demick | |
| 5,505,516 A * | 4/1996 | Spykerman et al. | 297/188.14 |
| 5,556,017 A * | 9/1996 | Troy | 224/275 |
| 5,562,331 A * | 10/1996 | Spykerman et al. | 297/188.16 |
| 5,599,054 A | 2/1997 | Butz et al. | |
| 5,647,652 A * | 7/1997 | Zalewski et al. | 224/539 |
| 6,003,716 A * | 12/1999 | Allison et al. | 220/326 |
| 6,045,173 A * | 4/2000 | Tiesler et al. | 296/37.8 |
| 6,056,177 A | 5/2000 | Schneider | |
| 6,116,674 A | 9/2000 | Allison et al. | |
| 6,135,527 A | 10/2000 | Bily | |
| 6,203,088 B1 * | 3/2001 | Fernandez et al. | 296/24.34 |
| 6,231,096 B1 * | 5/2001 | Bollmann et al. | 296/37.16 |
| 6,247,741 B1 | 6/2001 | Seel et al. | |
| 6,264,261 B1 * | 7/2001 | Krafcik | 296/37.8 |
| 6,290,277 B1 | 9/2001 | Spykerman et al. | |
| 6,338,518 B1 * | 1/2002 | D'Annunzio et al. | 296/37.8 |
| 6,435,587 B1 * | 8/2002 | Flowerday et al. | 296/37.8 |
| 6,497,441 B1 * | 12/2002 | Mahmood et al. | 296/24.34 |
| 6,497,443 B1 * | 12/2002 | Worrell et al. | 296/37.8 |
| 6,719,343 B1 * | 4/2004 | Emerling et al. | 296/24.34 |
| 6,719,367 B1 * | 4/2004 | Mic et al. | 296/37.8 |
| 6,761,388 B1 * | 7/2004 | Lein et al. | 296/24.34 |
| 6,932,402 B1 * | 8/2005 | Niwa et al. | 296/24.34 |
| 7,007,993 B1 * | 3/2006 | Kubota | 296/24.34 |
| 2001/0020631 A1 | 9/2001 | Spykerman et al. | |
| 2002/0089203 A1 | 7/2002 | Flowerday et al. | |
| 2005/0035618 A1 * | 2/2005 | Toth et al. | 296/24.34 |

FOREIGN PATENT DOCUMENTS

| | | |
|---|---|---|
| DE | 4340675 | 6/1995 |
| JP | 04 50047 | 2/1992 |
| JP | 09 328039 | 12/1997 |

* cited by examiner

FLOOR CONSOLE

CROSS-REFERENCE TO RELATED PATENT APPLICATIONS

The present invention claims priority from U.S. Provisional Patent Application No. 60/410,226 titled "FLOOR CONSOLE" filed Sep. 12, 2002, the full disclosure of which is hereby incorporated herein by reference.

BACKGROUND

The present invention relates generally to the art of vehicle storage devices and more particularly to consoles which may be used between spaced-apart seats or other locations in a vehicle. In its most preferred embodiment, the present invention relates to a low profile floor console having end walls which may be raised to provide a storage area and to add-on modules which may be disposed between such walls and used for a variety of end use applications.

A wide variety of console systems for vehicles are currently in use and are described in various publications, including patents. The popularity of consoles has increased dramatically in recent years with the popularity of SUVs, vans, light trucks, and the like, as well as of sedans having split front seats. Consoles are known to provide enhanced functionality, such as storage bins for CDs, DVDs, maps, change bins, as well as additional features such as power ports, cup holders, trays, and the like. In some vehicles, the gear shift lever and/or the parking brake may be part of the center console, as may a variety of controls for such vehicle components such as lights, heating and cooling systems, mirrors, etc.

While consoles such as those described above are popular, they do present one disadvantage, i.e., they typically occupy the full area between the seats and extend from the floor to a level at or even above the level of the seat cushions. Accordingly, it is not possible to pass long items such as skis, lumber, etc. through from the rear of the vehicle to the front of the vehicle. Also, such known consoles inhibit occupant "pass-through" due to their relatively high profile or stature. Moreover, such center consoles close off the area between the seats and do not provide for a range of functionalities which would be desirable for certain vehicles, such as family vehicles, vehicles used for camping or various work purposes wherein different needs may exist for different vehicle drivers and passengers.

Storage consoles are also known for use in areas of vehicles other than between the seats. For example, in Seel et al., U.S. Pat. No. 6,247,741 issued Jun. 19, 2001, for "Stowage Apparatus for a Cargo Area of a Motor Vehicle", a stowage is shown for use behind the second row of seats in an SUV. In the device shown in the '741 patent, covers for a storage area pivot upwardly and netting may be used to define a storage area therebetween. In particular, FIGS. 15 and 16 of the '741 patent of the patent illustrate a system in which U-shaped retaining brackets may pivot downwardly when not in use. They may be used to support wire baskets in one embodiment or storage nets in another.

An example of another type of vehicle storage device is shown in Demick, U.S. Pat. No. 5,492,257, issued Feb. 20, 1996, for "Back Panel Organizer for Van-type Motor Vehicles". In the device shown in the '257 patent, a U-shaped storage element having a leg portion may be pivoted from the rear of a seat. It includes brackets or other elements for supporting items within a storage area, such as plastic shopping bags (e.g., which are not self-supportive).

Center consoles for vehicles are also illustrated in the prior art, such as that shown in Landry, U.S. Pat. No. 5,397,160, issued Mar. 14, 1995, for "Vehicle Console."

It is further known that height adjustable storage systems may be used for storage and as an arm rest. For example, see Huang, U.S. Pat. No. 5,289,957, issued Mar. 1, 1994, for "Container Fixing Support".

It is further known that consoles may be removed and placed in various locations within a vehicle. In this connection, see U.S. Pat. No. 6,116,674, issued Sep. 12, 2000 to Allison et al. for "Removable Console for Use with a Vehicle".

An additional example of a removable console is provided in Young et al., U.S. Pat. No. 5,338,081, issued Aug. 16, 1994, for "Removable Floor-Mounted Console".

In addition to the devices mentioned herein, additional examples of storage containers, most of which are useful with vehicles, can be found in German Patent DE3831317 C1 issued Sep. 15, 1988; U.S. Pat. No. 4,805,859 issued Feb. 21, 1989, to Hudson for "Apparatus for Securing Containers to Moving Platforms"; U.S. Pat. No. 6,290,277 issued Sep. 18, 2001, to Spykerman for "Cargo Management and Article Support Systems"; U.S. Pat. No. 5,599,054 issued Feb. 4, 1997, to Butz et al. for "Vehicular Storage Apparatus for Elongated Objects"; U.S. Pat. No. 1,179,445 issued Apr. 18, 1916, to Manning for "Combined Automobile Trunk and Device for Preventing Theft of Automobiles"; U.S. Pat. No. 1,412,192 issued Apr. 11, 1922, to Moore for "Adjustable Detachable Bumper and Carrying Rack"; U.S. Pat. No. 6,056,177 issued May 2, 2000, to Schneider for "Collapsible Storage Container for Vehicles"; U.S. Pat. No. 6,135,527 issued Oct. 24, 2000, to Bily for "Cargo Compartment Organizer"; U.S. Pat. No. 4,941,718 issued Jul. 17, 1990 to Alexander III et al. for "Concealed Retractable Housing"; and Japanese patent 404050047A issued Feb. 19, 1992.

It can be seen then that a wide variety of console systems are already known, but that many suffer from disadvantages such as those mentioned above. A lower profile, highly functional console system would represent a significant advance in the art.

FEATURES AND SUMMARY

It is a primary feature of the present invention to provide a low profile floor console.

Another feature of the present invention is to provide a console system which may be used for storage and which includes an opening for a parking brake lever.

Yet another feature of the present invention is to provide a low profile console system which has walls which may be pivoted or otherwise raised to define a storage area therebetween.

A different object of the present invention is to provide a low profile floor console which allows elongate articles to be passed between a row of seats and/or an occupant to pass between seats.

A still further feature of the present invention is to provide a low profile floor storage console which provides a variety of additional functions, such as cup holders, change bins, power ports, map pockets, trays and the like.

Another feature of the present invention is to provide a low profile console storage system which includes netting or fabric which is automatically deployed after raising opposed walls of the console.

A further feature of the present invention is to provide add-on modules for floor consoles.

A different feature of the present invention is to provide an add-on console which includes a slidable top, which itself may include such items as trays, cup holders, etc.

A different feature of the present invention is to provide add-on modules for floor consoles which may be used for applications other than storage, such as coolers, kid or baby modules, infotainment modules, work modules, etc.

Another feature of the present invention is to provide a sliding top for an add-on module for a floor console.

A still further feature of the present invention is to provide functionality within the walls of the floor console itself, such as map pockets.

Another feature of the present invention is to provide trim elements in a low-profile floor console to cover fasteners and in which certain components of the floor console may be utilized in certain vehicles and not in others, thereby providing a modular floor console.

How these and further features of the present invention are accomplished individually, collectively, or in various subcombinations will be described in the following detailed description of the preferred embodiment, taken in conjunction with the FIGURES. Generally, however, they are provided by a low profile floor console which is attached to the floor of a vehicle, and in the preferred embodiment, between spaced-apart seats in a seating row. The floor console includes a pair of opposed walls which pivot upwardly to provide end walls for a storage area defined therebetween. In an illustrated embodiment, netting is disposed between the walls so that a storage area is immediately formed when the walls are raised to a storage and locked position. Also in the illustrated embodiment, additional functionality is provided for the trim surrounding the storage area, including cup holders, a change bin, and a trim area designed to receive and permit functioning of a parking brake lever. Add-on modules are also disclosed in connection with the preferred embodiment, the modules being lowered into the area between the end walls. The add-on module may have a sliding top, and includes one or more trays, cup holders, and the like. In an alternate embodiment, a power port is shown. In this embodiment, additional modularity is also provided for the pivoting walls, e.g. map pockets formed on the inner surface thereof. Further, the add-on modules may provide additional functionality such as a cooler, a kid module, a baby module, a work module, an infotainment module, and the like. It is also disclosed in the present invention that the module may be used in areas of the vehicle other than between seats, such as in the rear cargo area of an SUV or van. Other ways in which the above-referenced and other features of the present invention are accomplished will become apparent to those skilled in the art after they read the following detailed description of the preferred and alternate embodiments. Such other ways are deemed to fall within the scope of the present invention if they fall within the scope of the claims which will follow.

BRIEF DESCRIPTION OF THE FIGURES

In the following FIGURES the same reference numerals will be used to denote like components; and.

DETAILED DESCRIPTION OF THE PREFERRED AND ALTERNATE EMBODIMENTS

Figure 1:
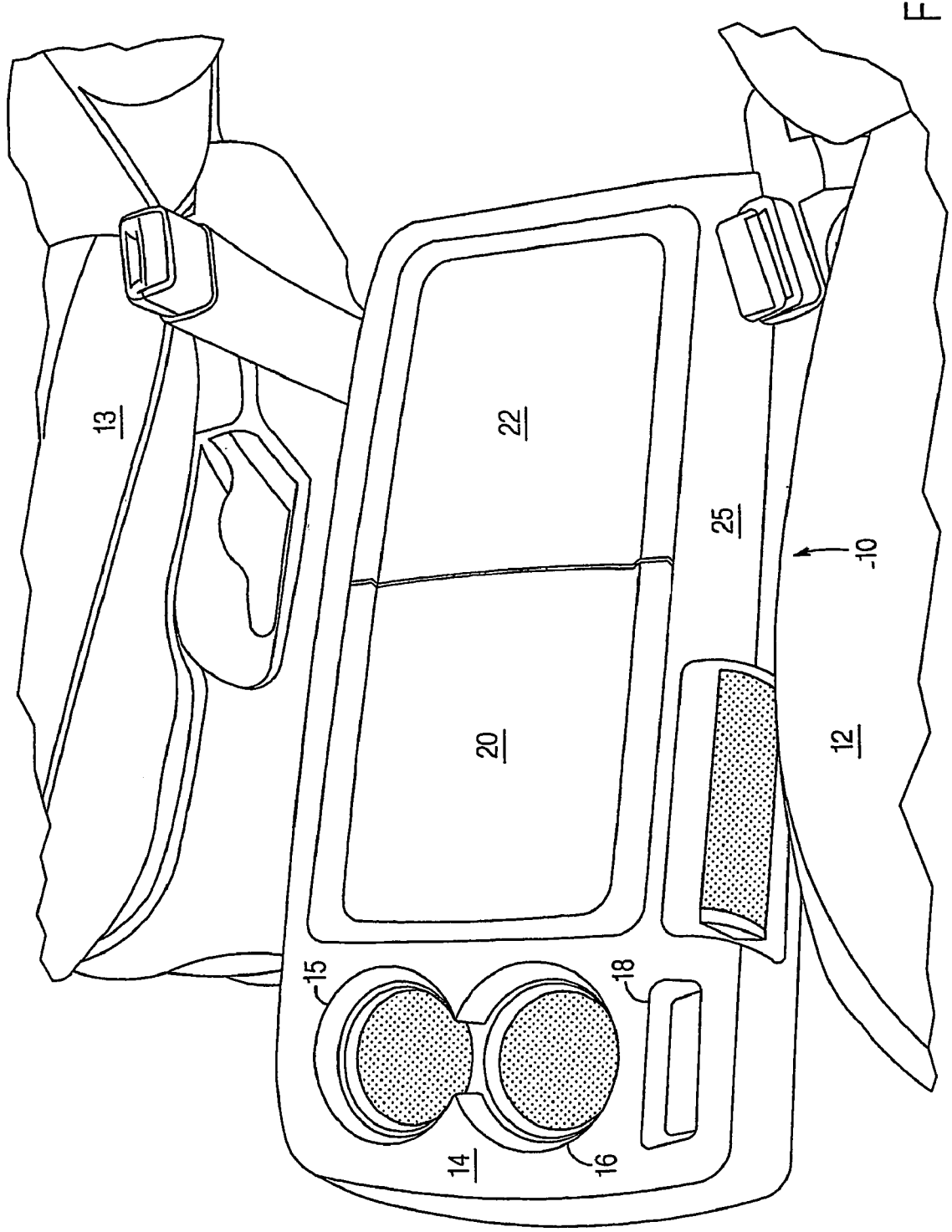
FIG. 1 is a perspective view of the floor console of the preferred embodiment of the present invention with the walls in their closed or low profile position.

Before proceeding with the detailed description of the preferred and alternate embodiments of the present invention, several general comments can be made about the applicability and the scope thereof. First, the preferred embodiment illustrated in FIGS. 1–5 shows certain features for the floor console, including an access opening for a parking brake lever, two cup holders, and a change bin. These features may be modified and may include, for example, a gear shift lever, no lever, and the trim may include different functionality enhancing components surrounding the storage area thereof. Non-limiting examples include electrical switches and controls, indicators, lights, beverage holders, trays, vents, bins, and various other electrical components or non-electrical components for operational, entertainment, occupational or comfort purposes. Also, the components or features (e.g., cargo spaces, bins, receptacles, cup holders, lids, trays, etc.) are configured to be modified (configured, reconfigured, positioned, repositioned, changed, interchanged, etc.) by the user depending on the desired use, functionality, or the like.

Second, netting is shown in the illustrated embodiment extending between the end walls, but fabric may be substituted therefore, including fabric which has an elastic character. In addition, it is not necessary to have any containment extending between the end walls, e.g. if the floor module will be used with add-on modules, or if the overall console is designed to allow articles to fit between the end walls, e.g., a purse, a briefcase, or the like.

Third, the particular materials used for making the floor console and its associated components may be selected from those well known in the vehicle art including polymers, elastomeric materials, metals and metal alloys, etc.

Fourth, one particular type of add-on module is shown in the preferred embodiment which includes cup holders, a tray, as well as a sliding top. The functionality provided at the lid of the console can vary from a simple design which has padding and "A" surface trim (wherein the storage module would serve as an arm rest) to a lid including additional functionality as described hereinabove. Furthermore, the lid may be opened in any of a variety of ways, including pivoting to the front, the rear, or to either side, as well as the sliding system shown and described and being completely removable as a separate piece.

Fifth, the floor console is shown in several of the FIGURES as residing between a pair of spaced apart seats. It should be recognized that the preferred embodiment is for use between the front row of seats, but the floor console of the present invention can be used at that location and another floor console can be added between other rows of seats within the same vehicle, or the console could be located only between seating behind the first row or in other locations, such as a cargo area, a trunk, or the like. The modules could also be adapted to be placed or held in a certain location outside of the vehicle. For example, if the module is to store music or video CD's it could be stored at home in an entertainment center or other place where the contents could easily be accessed. Other type of modules which have dual uses include tool storage modules, baby item storage modules, etc. Also, multiple modules could be used within a vehicle such that each has a home space or console location (e.g., between front seats, between rear seats, in cargo area, etc.) but could be moved about to the different console locations depending on the desired functionality (i.e., configurable, reconfigurable, changeable, interchangeable, repositionable, etc.). Further, the modules are also adaptable to be used outside of the vehicle (e.g., as a work space, cooler, infotainment unit, storage container, table surface, etc.).

Figure 6:
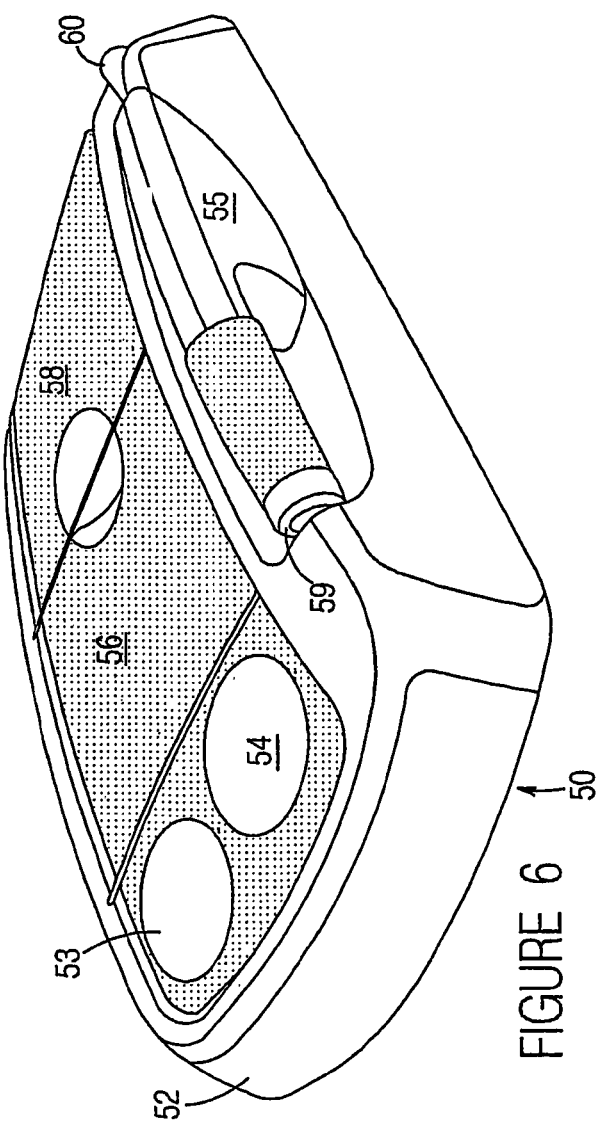
FIG. 6 is a perspective view of a floor console according to an alternate embodiment of the present invention.

Sixth, an alternate embodiment to the present invention is shown beginning with FIG. 6 and a power port is provided (e.g., a DC power port). Alternate locations for the power port will readily appear to those skilled in the art and are deemed to fall within the scope of the invention. Alternatively, any of a variety of electrical or electronic interfaces may be provided, such as other types of power sources or outlets (e.g., 110 VAC), data, or the like. Furthermore, in the first alternate embodiment, the trim is textured primarily for aesthetic purposes. Such texturing is not, in and of itself, required in any embodiment of the invention.

Figure 8:
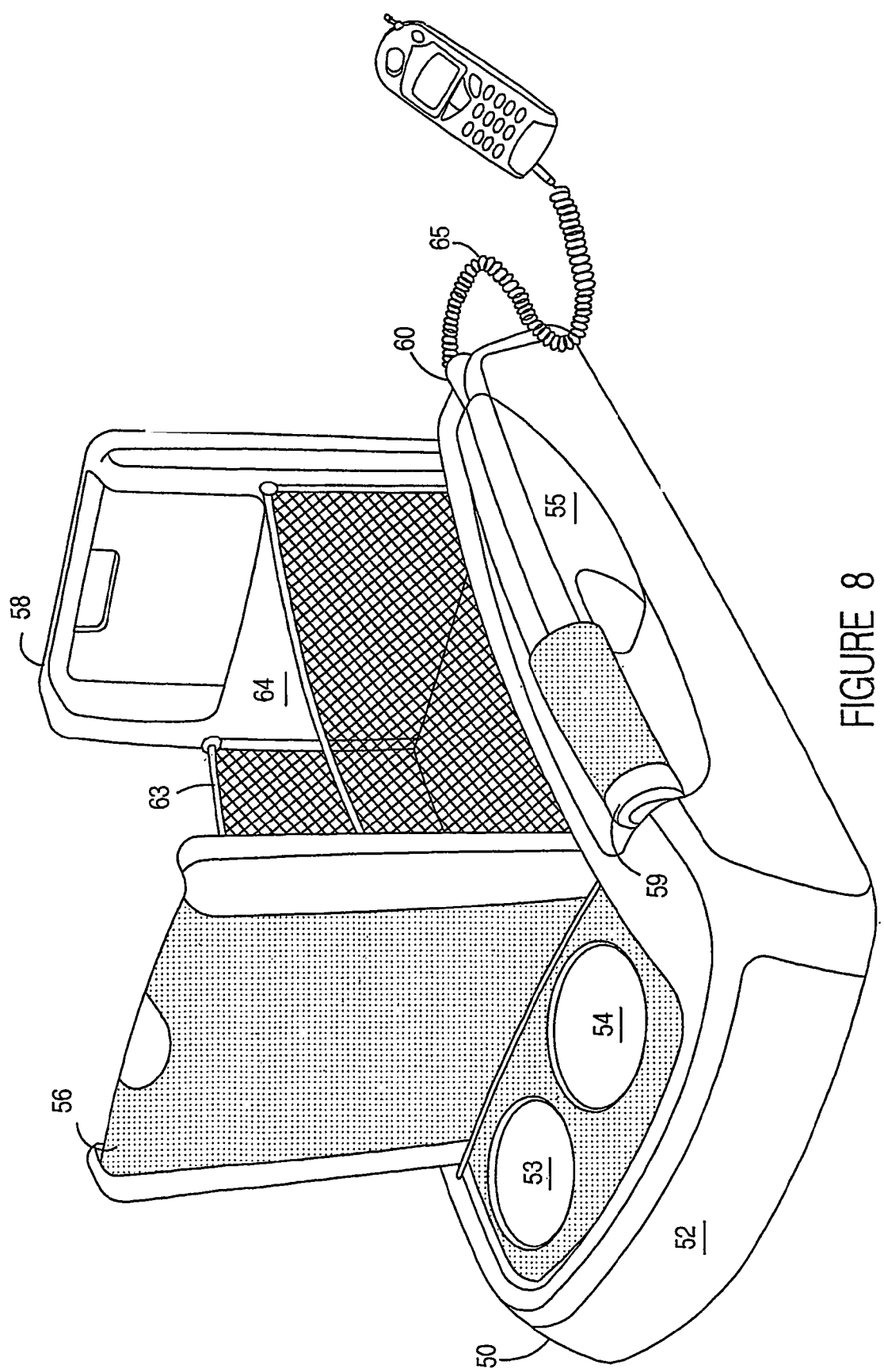
FIG. 8 is a perspective view of the console of FIG. 6 in the open or deployed position.
Figure 9:
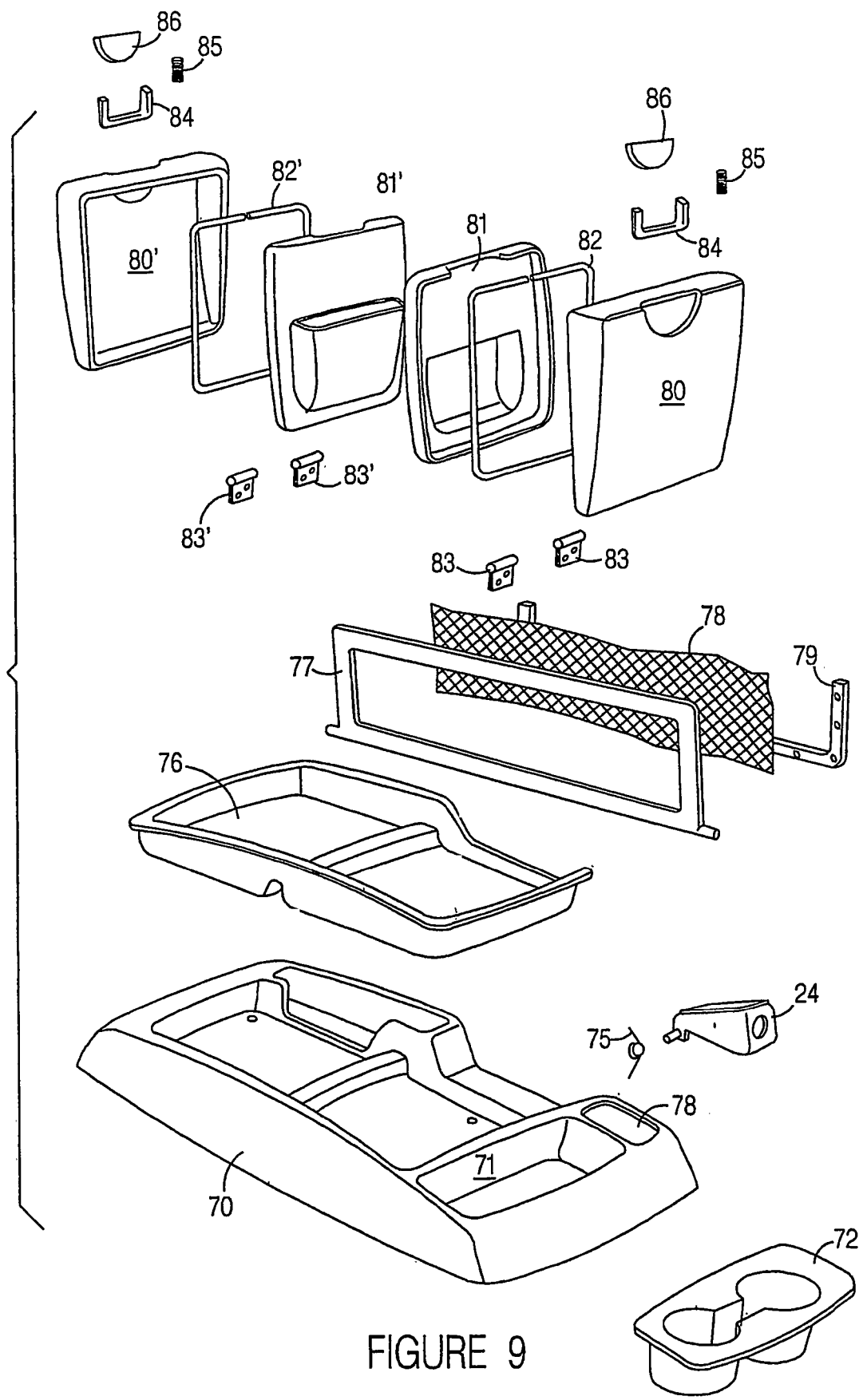
FIG. 9 is an exploded view showing the components of an alternate embodiment similar to that shown in FIGS. 6–8, but showing side wall frames and a different location for a power port.

Seventh, the end walls are shown in FIGS. 8 and 9 to include their own functionality, namely map pockets. However, the interior surface of the walls may be variously embodied to include other functional features, such as stretch pockets, lighting for the storage area, etc.

Figure 11:
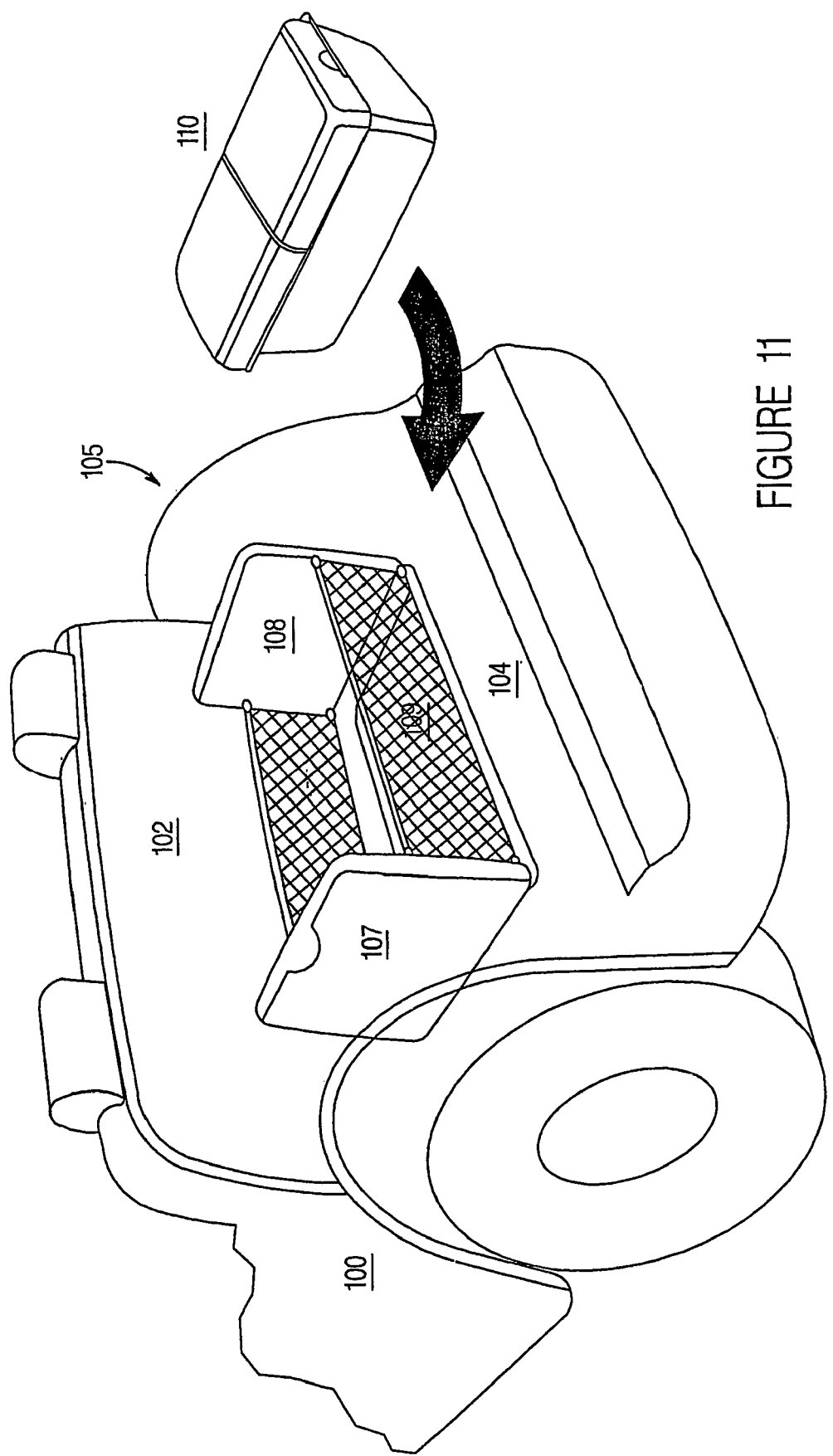
FIG. 11 is a partial schematic view showing the floor console system of the present invention located in the cargo area of a vehicle.

Eighth, as illustrated in FIG. 11, other locations can be selected for the floor module of the present invention, including the rear seat storage area of a van, SUV, a vehicle trunk, or the like. It should also be appreciated that add-on modules which may be used with the floor console of the present invention may be stored elsewhere in the vehicle, such as in the cargo area, so they may be readily detached therefrom and placed over the end walls of the floor module when desired.

Ninth, the floor module of the present invention typically will include a mat to hide fasteners used to secure the module to the vehicle floor, and various plugs or trim pieces may be employed to cover openings which may be required or desired in some vehicle models or some vehicle locations and not in others to preserve the desired aesthetic appearance of the overall system. For example, service openings may be covered for appearance sake.

Finally, while the present invention primarily relates to the use of end walls (namely forward and rear walls), the invention also contemplates the use of side walls (extending longitudinally of the vehicle) which extend upwardly to define a storage area therebetween and fabric, netting, or other material located at the front and rear of the console, rather than along the sides thereof.

FIG. 1 shows a floor console system 10 located between a pair of seats 12 and 13. System 10 includes surrounding plastic trim 14 which includes one or more storage receptacles (shown as a pair of cup holders 15 and 16 and a change bin 18). System 10 further includes a pair of walls, a forward one 20 and a rear one 22. Furthermore, a parking brake lever 25 is shown in this FIGURE.

Figure 2:
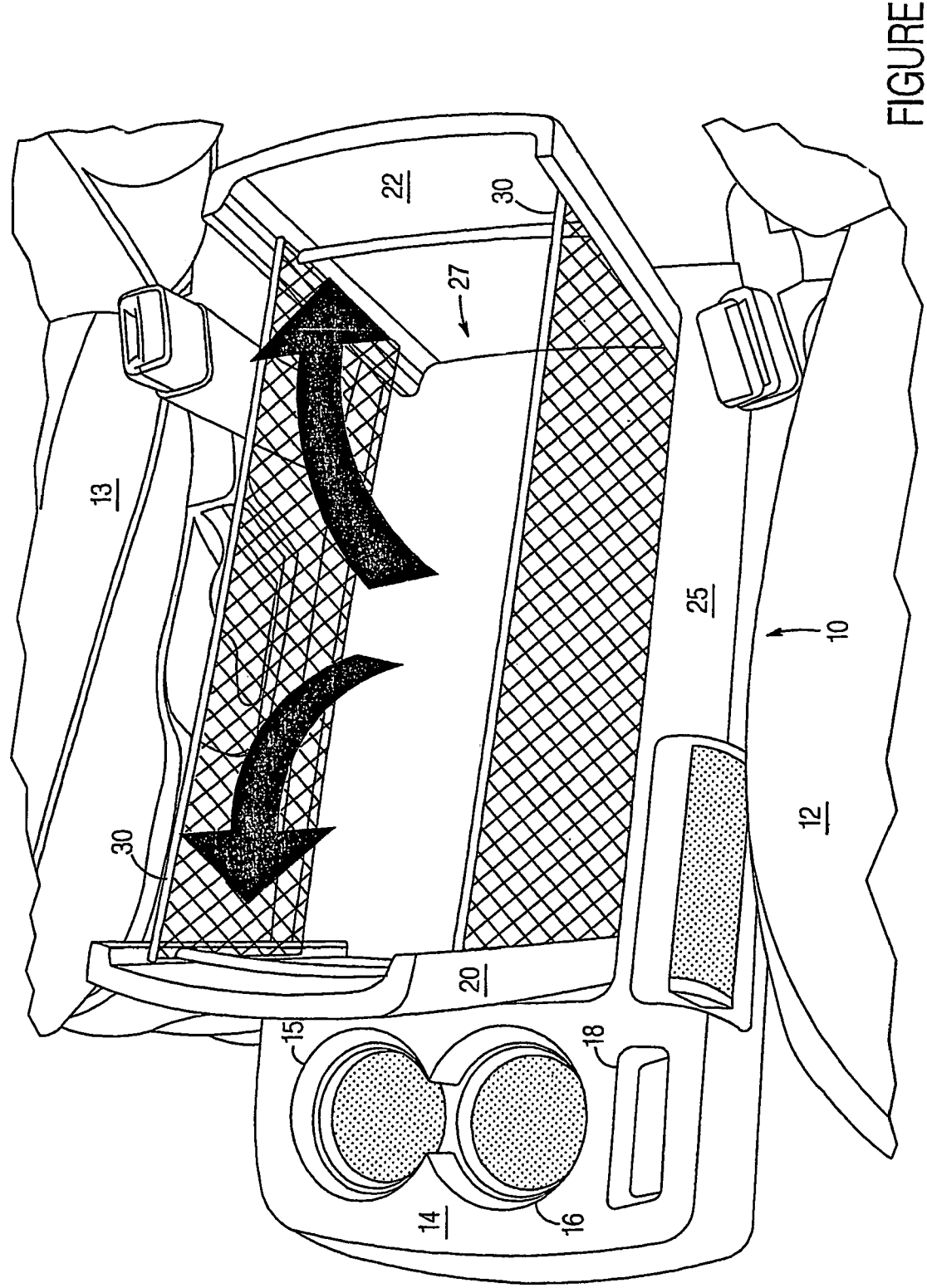
FIG. 2 is a perspective view of the floor console of FIG. 1 with the walls opened and netting extending therebetween.

In FIG. 2, walls 20 and 22 are shown rotated about their forward and rearward ends, respectively, by approximately 90° to assume upright positions generally perpendicular to the floor 27 of floor console system 10. In addition, a flexible member (e.g., wall, barrier, panel, etc.) shown as a netting strip 30 is located on both sides of console system 10, and they extend between walls 20 and 22. It is preferred that the walls 20 and 22 spring biased to the positions shown in FIGS. 1 and 2 and are of the over-center or push-push variety and include mechanisms well known in the vehicle and in other arts which need not be described in detail. Not shown in the drawings, but appreciated by those skilled in the art, are the pivot pins which extend from the walls 20, 22 into the plastic trim 14 on the lower portion of the sides thereof.

Figure 3:
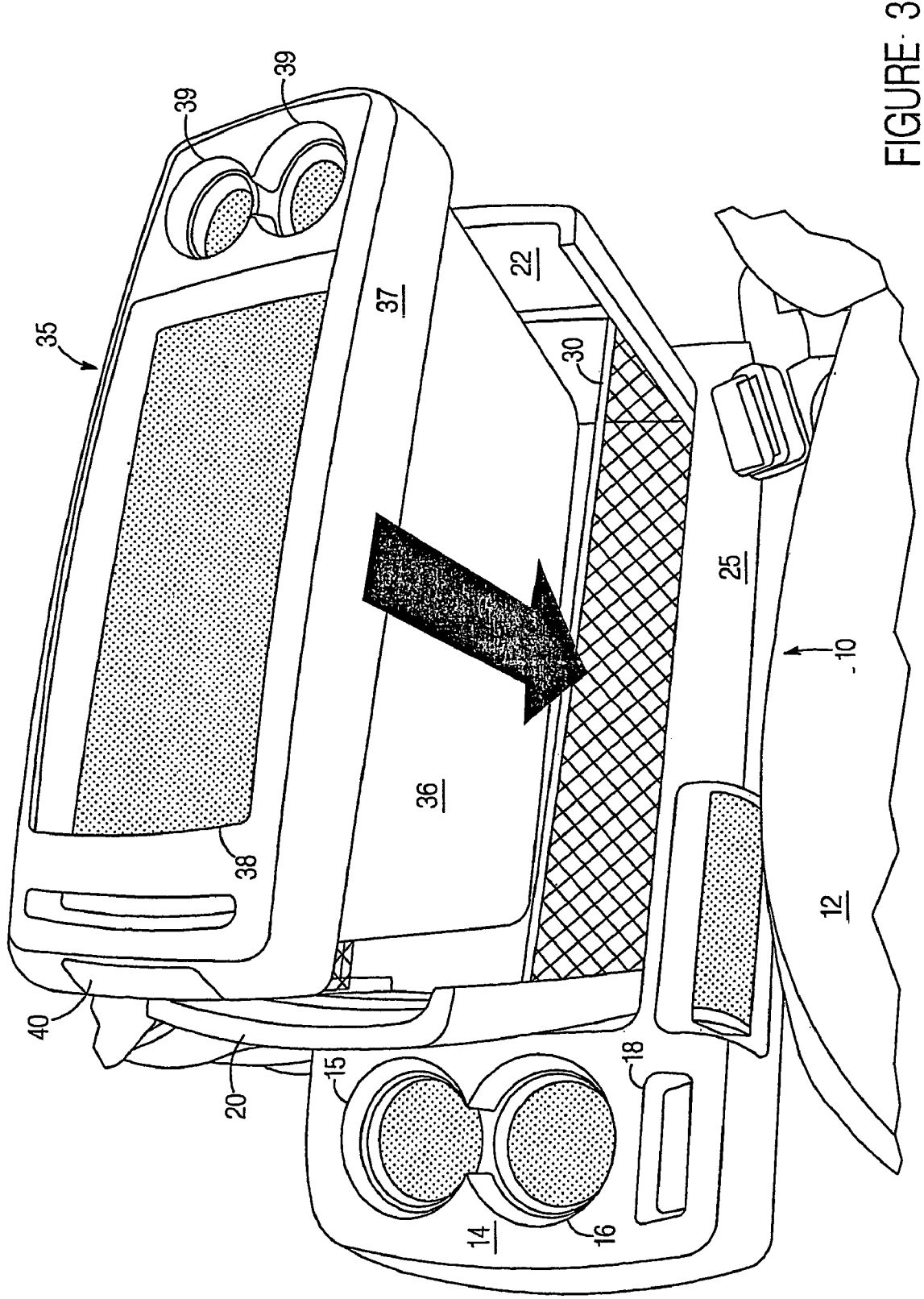
FIG. 3 is a perspective, schematic view showing an add-on module being lowered between the end walls of the console of the preferred embodiment illustrated in FIGS. 1 and 2.

The next figure, FIG. 3, shows an add-on module 35 including a storage base 36 adapted to fit within the netting and the walls 20, 22 as indicated by the arrow. The top 37 of the module 35 includes one or more receptacles (shown as a recessed tray 38 and a pair of cup holders 39), and a latch release 40.

Figure 4:
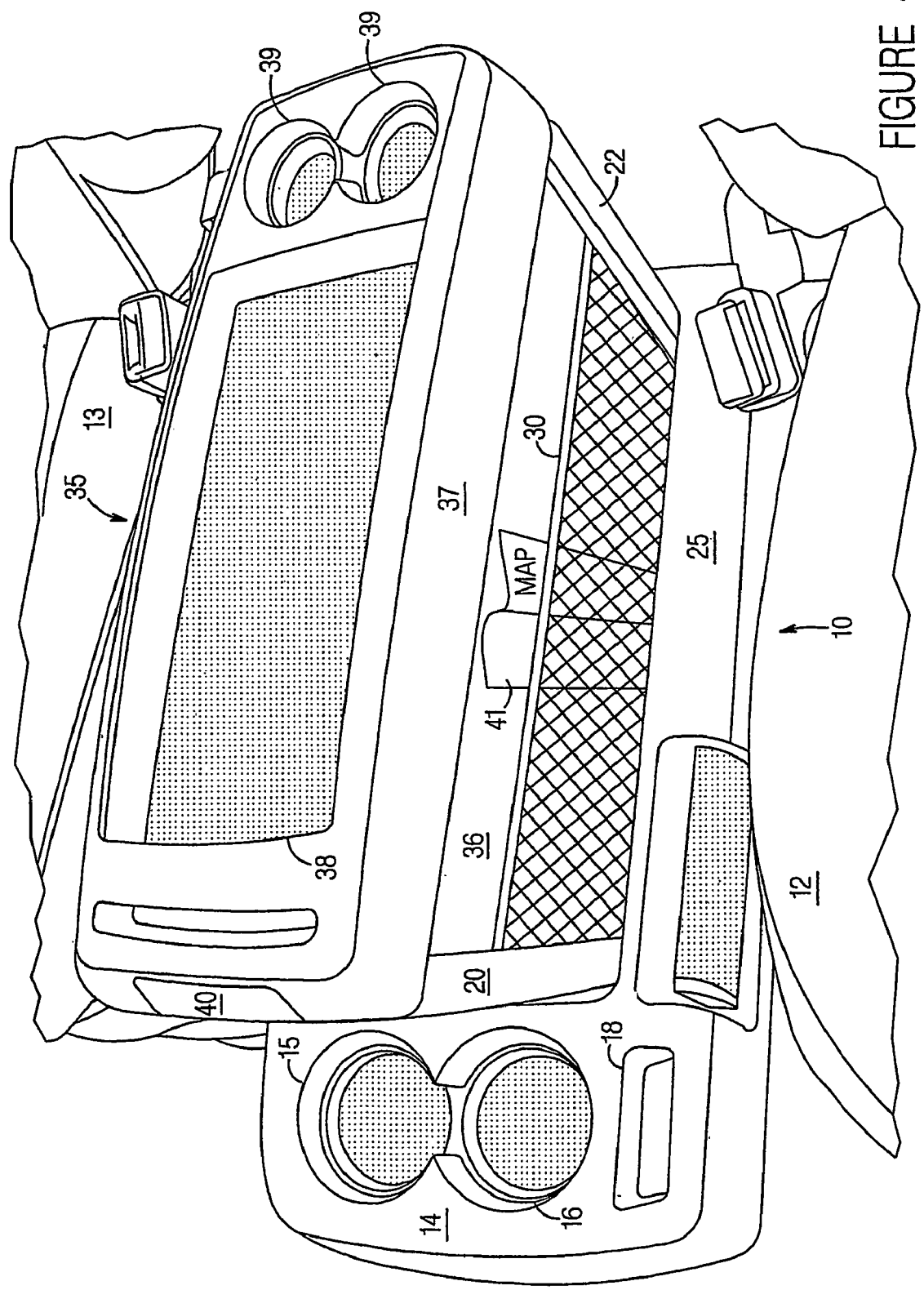
FIG. 4 is a view, similar to FIG. 3, but showing the add-on module lowered onto the top of the end walls of the floor console of the preferred embodiment of the present invention as shown in the previous FIGURES and additional storage between the netting and the module.

In FIG. 4, the same components are shown, but add-on module 35 is shown fully lowered (e.g., inserted, engaged, etc.) so that the underside of top 37 rests on the uppermost ends of walls 20 and 22. Furthermore, a map 41 is shown in a storage space provided between the sides of add-on module 35 and netting 30. This additional storage could be used for a variety of other objects.

Figure 5:
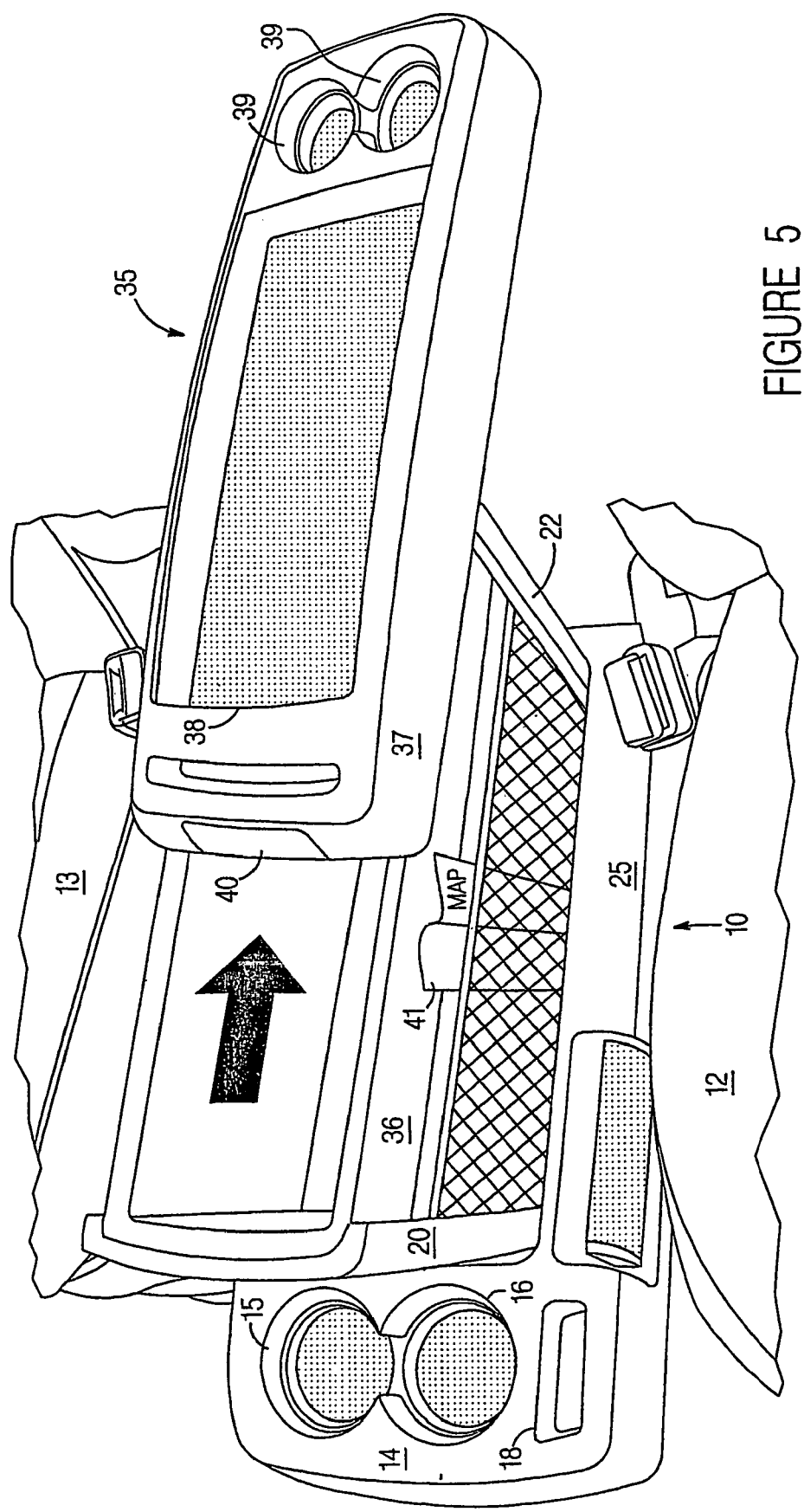
FIG. 5 is a perspective view, similar to FIG. 4, but showing the lid of the add-on module in a position in which the lid has been moved rearwardly to allow access to the interior of the add-on module.

Proceeding with the description of the preferred embodiment, FIG. 5 is identical in all respects to FIG. 4, except top 37 has been moved by a sliding action to a rearward location with respect to that shown in FIG. 4. The mechanisms for accomplishing this movement, in one preferred way, is illustrated in a subsequent FIGURE and will not be described in further detail here. It should be appreciated at this point that the inside of the storage base 36 is now easily accessible either by the driver or a front seat occupant.

From the description so far, it will be appreciated that storage may be provided either by the netting 30 cooperating with the end walls 20 and 22, by an add-on module which may provide secure storage, by the netting cooperating with the side walls of an add-on module as well as the functionality of the tray and cup holders. Furthermore, the cup holders may be used by rear seat occupants with this particular configuration. Different types of add-on modules can be substituted for that shown, including all of those mentioned in the "Background" section of the specification and the introductory section to this description of the preferred embodiment.

Figure 7:
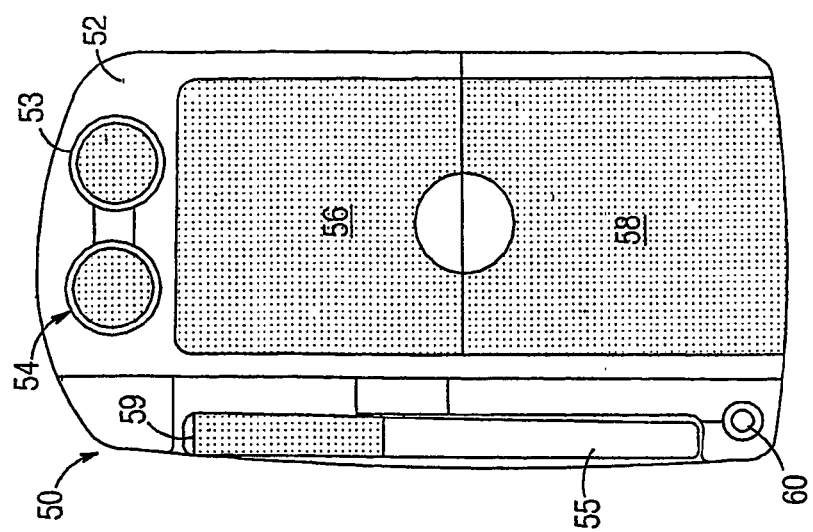
FIG. 7 is a top plane view of the floor console of FIG. 6.

A second embodiment of the present invention is illustrated in connection with FIGS. 6–8. In this embodiment, a low-profile floor module 50 is shown to include a base 52, a pair of cup holders 53 and 54, and a parking brake lever 55 extending through base 52 and accessible by a vehicle driver. A forward wall 56 and a rearward wall 58 are also shown. The operation of these walls is similar to that of walls 20 and 22 from the earlier figures. This particular embodiment also shows a textured surface which is primarily for aesthetic purposes and is found on both the floor of the cup holders 53 and 54, on walls 56 and 58, as well as the handle portion 59 of parking brake lever 55. In addition, a power port 64 is shown. Walls 56 and 58 are raised in FIG. 8 to show netting 63 extending between them. Another feature of the present invention is illustrated in FIG. 8, i.e., added functionality for the walls, in this case, a map pocket 64 located on the inner surface of wall 58. A similar pocket, or different functionality, can be provided on wall 56. In addition, a cellular telephone charging cord 65 is shown connected to power port 60.

In FIG. 9, an assembly view is shown for another embodiment of the invention. A base 70 for a floor console includes an opening 71 for receiving a cup holder module 72 and another opening 78 is provided for receiving a power port 74 having a spring 75 associated therewith. As provided with the end walls, the power port could be of the over-center or push-push type.

A tray 76 snap fits or is otherwise attached to base 70 and one of two side wall frames 77 is shown for being pivotally coupled to base 70. Frame 77 is covered by a net or fabric layer 78 and secured in place by outer half frame 79. It will be appreciated that two of the side wall frame assemblies 77–79 will function like the netting described in FIGS. 1–8, but here they are rigidly self-supporting as opposed to being connected to end walls. Frame 77 is also configured to support walls 80 and 80' in their upright (raised or deployed) position.

The end walls 80 and 80' are shown in this FIGURE along with map pocket moldings 81 and 81', as well as frames 82 and 82' (which are configured to provide structural support to the surfaces of walls 80 and 80' when in the lowered or stowed position). Pivot hinges 83 and 83' are crimped around the lower section of frames 82 and 82' and are also attached to base 70. Spring loaded latches include receivers 84, springs 85 and actuators 86. The various latches, over-center or push-push assemblies, and the like are well known, and in and of themselves, form no part of the invention.

Figure 10:
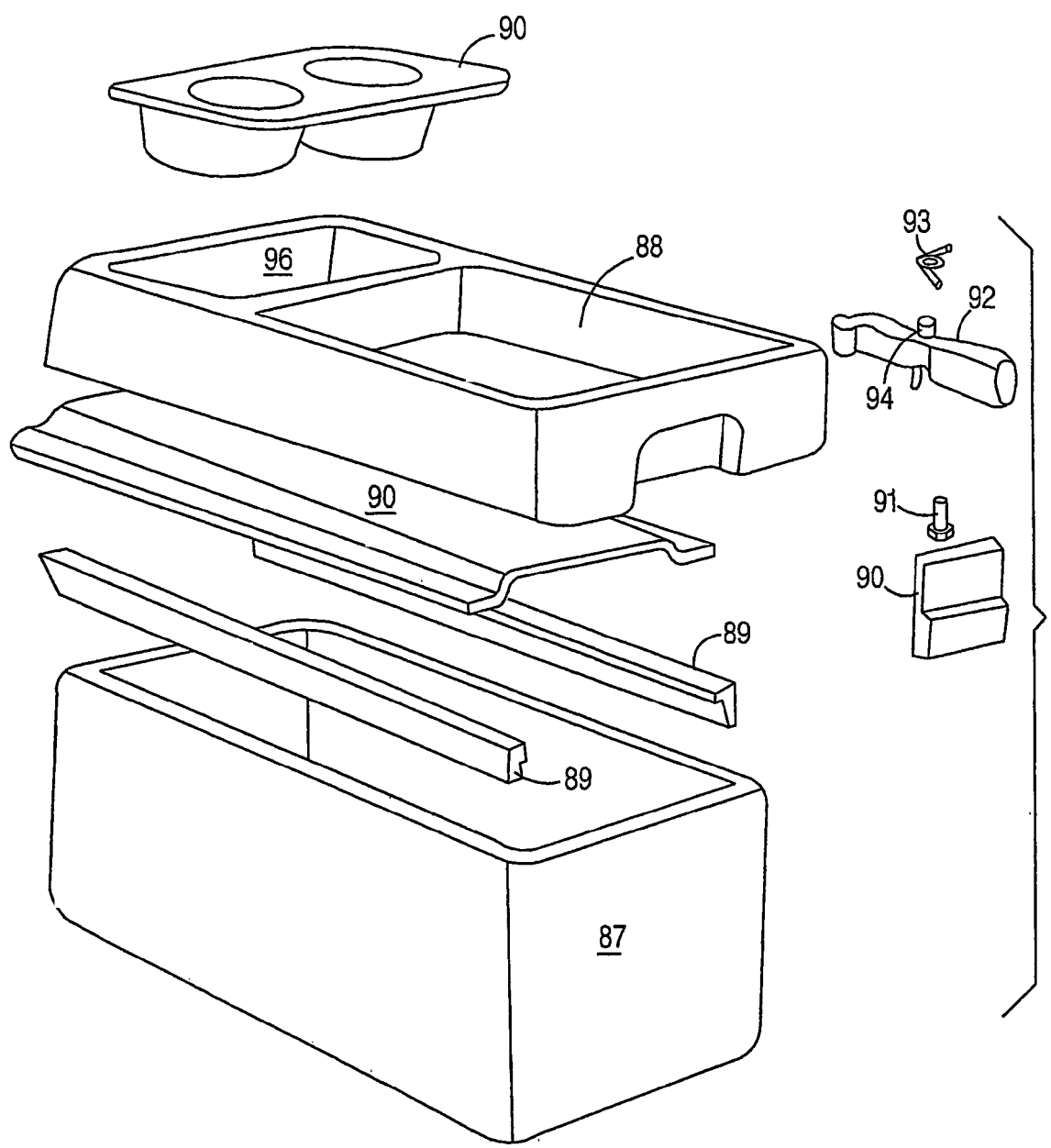
FIG. 10 is an exploded view showing the components used to provide a sliding lid on a storage add-on module useful with the floor console of the preferred or alternate embodiments of the present invention.

Referring next to FIG. 10, an add-on module with a base 87 and a sliding lid 88 is illustrated. Rails 89 are attached to the side walls of base 87, while a latch 90 is spring biased by spring 91 and coupled to the bottom of tray 88 for locking the module to the end walls (not shown). An independent slide mechanism includes a pivoting slide release 92 that enables plate 95 to slide with respect to base 87. It is spring biased by spring 93 and pivots about pin 94. Alternatively, the lid may be moveable in any of a variety of ways and ranges to allow access (visual and/or physical) to the interior space, such as pivoting, removing or detaching, or the like.

Other aspects of this embodiment include a tray 88, an opening 96 and a dual cup holder 97 sized to fit within opening 96. Other functionality, e.g., change bins, power ports, etc., could readily be substituted therefore.

In FIG. 11 floor console or cargo units 105 include a pair of walls 107 and 108, a netting layer 109 extending on either side and coupled between walls 107 and 108. An add-on module 110 is adapted to fit between walls 107 and 108, and netting 109. The add-on module may be selected from the variety of modules previously shown and discussed. Furthermore, the operation of the floor module in this particular location is similar, in that walls 107 and 108 can be lowered to provide a low profile storage module for a vehicle.

Figure 12:
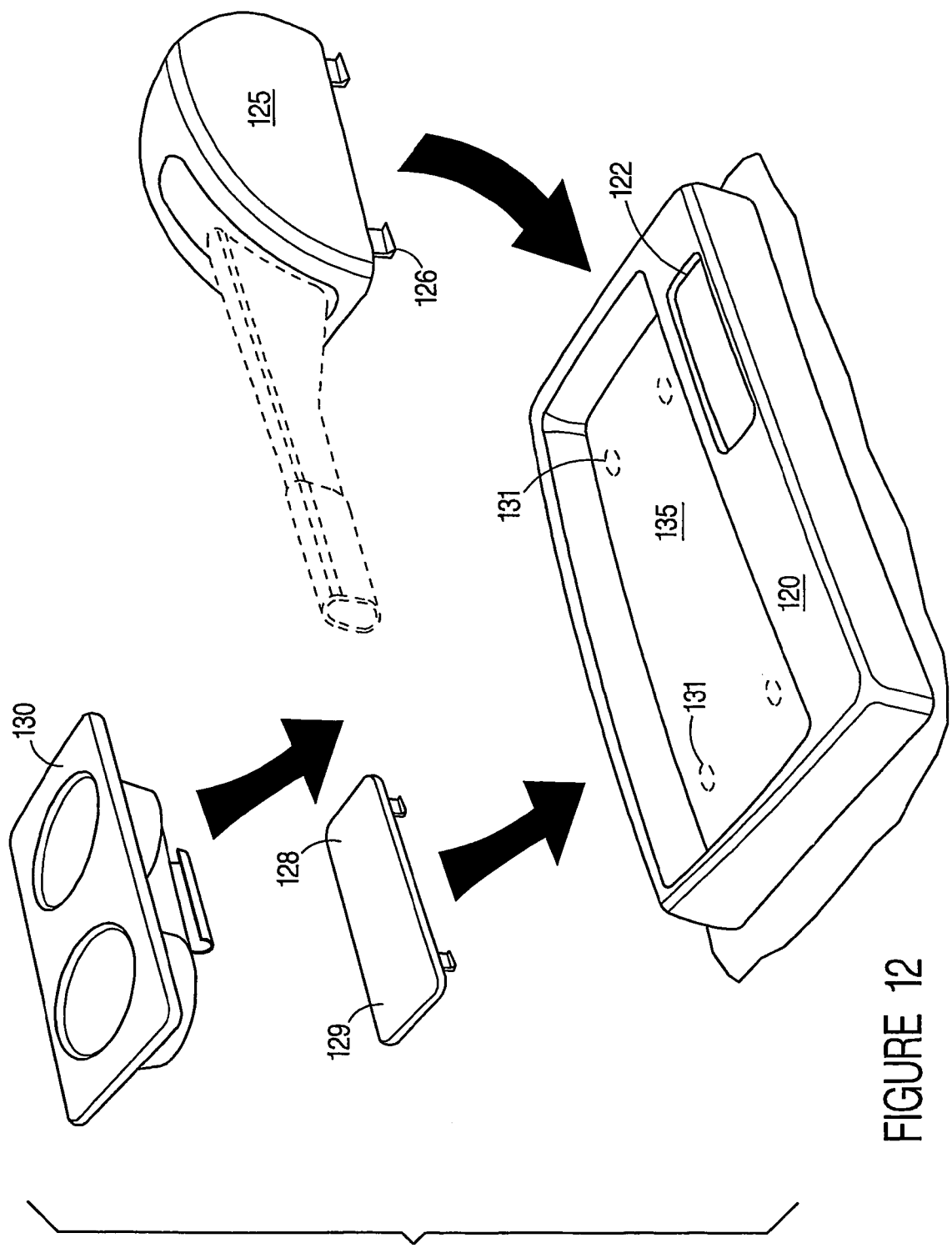
FIG. 12 is an illustrative view showing the modular nature of the floor console of the present invention and the alternate connection of a parking brake, a cup holder, or a trim plug within an opening of the floor console.

FIG. 12 shows additional benefits for the floor console discussed in connection with the first and second embodiments, and relates more to assembly and modularity concepts than to any particular structure. In FIG. 12, the base 120 of a floor console includes an opening 122 adapted to receive a vehicle control interface (shown as a parking brake lever assembly 125) therein. Alternatively, other vehicle control interfaces (e.g., gear shifter) may be adapted for use with the floor console. Note that connectors 126 are provided on parking brake lever assembly 125 to secure it within opening 122. The parking brake lever is shown in broken lines to illustrate the assembled position relative to assembly 125. If, for example, the module was to be used in a location other than between the front row of seats in a vehicle, a plug 128 having fasteners 129 could be placed within opening 122 for aesthetic purposes. Another example is also shown, i.e., cup holder 130 which can be coupled to opening 122 if desired. Alternatively, the cup holder may be selectively mounted in any of a variety of locations on the module. As such, the components and features on or for use with the modules are configured to be configurable by the user (and/or reconfigurable, adaptable, chargeable, customized, etc.). In addition, a mat 135 fits within base 120 to cover any fasteners 131 (shown in phantom) which may be used to secure base 120 to the vehicle.

While the present invention has been described above in connection with four preferred and alternate embodiments and several assembly and parts drawings, the invention can be adapted by those skilled in the art to solve a number of problems existing with present console systems including providing a low profile for the storage console when not in use. Quick storage may be readily obtained by opening the front and rear walls, and a variety of functionality can be provided by the selection of one or more add-on modules which fit between the walls and the netting or fabric layers extending therebetween. Accordingly, the invention is not to be limited by the aforementioned description or the illustrations, but is to be limited solely by the scope of the claims which follow.

The present inventions described in the foregoing specification comprise one or more of the following advantageous features which are claimed below (individually, collectively or in various subcombinations):

(1) a low profile floor console;

(2) a floor console with walls which open to provide storage capabilities;

(3) a low profile floor console which includes functional features such as cup holders, change bins, trays, switches, lights, indicators, openings for a parking brake, instrument dials and gauges, etc.;

(4) a low profile floor console which provides storage between walls and in which sides may be constructed of fabric, netting, or other rigid or flexible materials, including materials having elastic properties;

(5) a low profile floor console in which the walls are spring biased to opened and closed positions;

(6) a low profile floor console which may be used in locations other than between seats of a vehicle, including, but not limited to, the cargo area of the vehicle;

(7) any of a variety of add-on modules for use with a low profile floor console including storage modules, coolers, kid modules, baby modules, infotainment modules, work modules, office modules, and the like;

(8) a low profile floor console which includes openings which can be closed by cover plugs, cupholders or different functional devices;

(9) a low profile floor console which may include an add-on module having a sliding top;

(10) a low profile floor module including walls which have a variety of external surface characteristics, including textured characteristics, and which may have functionality on their inner sides, including, but not limited to map pockets, stretch pockets, or lights;

(11) a low profile floor console with a power port;

(12) a low profile floor console in which an add-on module may include a lid having a closure position and an access position.

(13) a low profile floor console add-on module culmination which includes a storage area between netting and the module.

(14) a low profile cargo unit that has add-on modules which may be used at locations outside of a vehicle.

It is also important to note that the construction and arrangement of the elements of the floor console as shown in the preferred and other exemplary embodiments are illustrative only. Although only a few embodiments of the present invention have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the claims. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and/or omissions may be made in the design, operating conditions and arrangement of the preferred and other exemplary embodiments without departing from the spirit of the present invention as expressed in the appended claims.

What is claimed is:

1. A floor console system for use in a vehicle having a seating row with a first seat and a second seat spaced apart within the vehicle and mounted to a floor of the vehicle, the floor console system comprising:
a base disposed above the floor of the vehicle between the first seat and the second seat;
a first panel rotatably coupled directly to the base;
a second panel rotatably coupled directly to the base wherein the first panel and the second panel are rotatable between a lowered position and a raised position;
a first flexible member coupled to the first panel and to the second panel;
a second flexible member coupled to the first panel and to the second panel, wherein a storage area is defined by the first panel, the second panel, the first flexible member, the second flexible member, and the base when the first panel and the second panel are rotated to the raised position;
a module configured to be removably retained when being at least partially disposed in the storage area;
wherein the floor console provides a low profile condition when the first panel and the second panel are in the lowered position and provides an additional storage area condition when the first panel and the second panel are rotated to the upright position.

2. The floor console system of claim 1 wherein the first and second panels are spring biased to the raised position or the lowered position.

3. The floor console system of claim 1 wherein the base comprises at least one of a tray, a removable tray, one or more cup holders, a power port, a parking brake, or combinations thereof.

4. The floor console system of claim 1 wherein the module comprises at least one of a tray, a removable tray, one or more cup holders, or combinations thereof.

5. The floor console system of claim 1 wherein a textured surface is provided on the cup holder, parking brake, first and second panels, or combinations thereof.

6. The floor console system of claim 1 wherein surfaces on the first and second panels provide a tray when in the lowered position.

7. The floor console system of claim 1 wherein each of the first and second flexible members comprise netting.

8. The floor console system of claim 7 wherein the netting is coupled to a rigid frame.

9. The floor console system of claim 1 wherein the first and second panels are configured for pivotal movement and provide side walls when in the upright position.

10. The floor console system of claim 1 wherein the module is configured to be supported by the first and second panels.

11. The floor console system of claim 1 wherein a secondary storage space is provided between walls of the module and the flexible member.

12. The floor console system of claim 1 wherein the module comprises a sliding top portion movable to expose an internal storage space of the module.

13. The floor console system of claim 10 wherein the module provides functionality selected from the group comprising a cooler, a children's module, a baby's module, an infotainment module, a work module, or combinations thereof.

14. The floor console system of claim 1 wherein the first panel is disposed towards the front of the vehicle, the second panel is disposed towards the rear of the vehicle.

15. The floor console system of claim 2 further comprising a second module interchangeable with the first module to be configured to be removably retained by being at least partially disposed in the storage area.

16. The floor console system of claim 1 further comprising a plurality of storage components adaptable for reconfigurable use with the base or the module.

* * * * *